United States Patent [19]

Darnell et al.

[11] Patent Number: 4,820,794

[45] Date of Patent: Apr. 11, 1989

[54] PROCESS FOR PREPARING POLYKETONE IN THE PRESENCE OF PERFLUOROALKYL SULFONIC ACID AND OXIDE OF PHOSPHORUS

[75] Inventors: William R. Darnell, Weber City, Va.; Winston J. Jackson, Jr., Kingsport, Tenn.

[73] Assignee: Eastman Kodak Company, Rochester, N.Y.

[21] Appl. No.: 38,682

[22] Filed: Apr. 15, 1987

[51] Int. Cl.$^4$ .............................................. C08G 83/00
[52] U.S. Cl. .................................. 528/271; 528/206; 528/207; 528/220; 528/364
[58] Field of Search ............... 528/271, 206, 207, 220, 528/364

[56] References Cited

U.S. PATENT DOCUMENTS 4,396,755 8/1983 Rose ..................... 528/271

Primary Examiner—Harold D. Anderson
Attorney, Agent, or Firm—Thomas R. Savitsky; William P. Heath, Jr.

[57] ABSTRACT

A new process for preparing polyketones (1) from at least one aromatic compound and at least one aromatic, aliphatic, and/or cycloaliphatic dicarboxylic acid or (2) from at least one self-polymerizable aromatic monocarboxylic acid or (3) from a mixture of (1) and (2) is disclosed.

16 Claims, No Drawings

PROCESS FOR PREPARING POLYKETONE IN THE PRESENCE OF PERFLUOROALKYL SULFONIC ACID AND OXIDE OF PHOSPHORUS

TECHNICAL FIELD

The invention relates to a new process for the preparation of polyketones. More specifically, the invention relates to a process for preparing polyketones from at least one dicarboxylic acid and at least one aromatic compound and/or at least one aromatic monocarboxylic acid in the presence of a perfluoroalkanesulfonic acid and an oxide of phosphorus.

This invention provides a new process for preparing useful polyketones by reacting in the presence of at least about one gram-mole of a material having a —P—O—P— unit (from an oxide of phosphorus) per gram-mole of carboxyl and a perfluoroalkylsulfonic acid the reactants selected from (a) at least one aliphatic, aromatic, or cycloaliphatic dicarboxylic acid and at least one aromatic compound as defined herein, (b) at least one self-polymerizable aromatic monocarboxylic acid, and (c) a combination of (a) and (b).

The polyketones produced according to this invention are useful as molding plastics, coatings, films, fibers, matrix resins, etc.

BACKGROUND OF THE INVENTION

We are not aware of any art which discloses the process of this invention. British Pat. No. 2,116,990 (also U.S. Defensive Publication T103,703) to ICI and H. M. Colquhoun, Polymer Preprints, 25 (2), 17-18 (1984), disclose a process for the preparation of poly(ether-ketones) (a) from dicarboxylic acids and aromatic compounds or (b) from monocarboxylic acids or (c) from a mixture of (a) and (b). It should be noted that the process disclosed in these references (1) does not utilize an oxide of phosphorus in any way, (2) is limited to special 'activated' dicarboxylic acids, monocarboxylic acids, and aromatic compounds, and (3) does not include such common dicarboxylic acids as terephthalic and isophthalic acids and such aromatic compounds as diphenyl ether or biphenyl (see page 2 lines 55-67 of the British patent). In Example 6 of the British patent, an attempt is made to prepare the poly(ether-ketone) from terephthalic acid and p-diphenoxybenzene in only trifluoromethanesulfonic acid (no oxide of phosphorus) at ambient temperature for 48 hr. No increase in solution viscosity was observed. Subsequently, the mixture was heated to 90° C. for 5 hr with only a slight increase in solution viscosity apparent. We have found that the addition of $P_2O_5$ to such a polymerization surprisingly gives a very high solution viscosity in only 10 minutes at ambient temperature (see Example 1 herein). Furthermore, the Colquhoun paper states in column 2 of page 17 that "Terephthalic acid, for example, fails to react at all with aryl ethers in $CF_3SO_3H$, ...".

U.S. Pat. No. 4,396,755 discloses a process which involves the polymerization of (a) a dicarboxylic acid(s) with an aromatic compound(s), (b) a self-polymerizable aromatic monocarboxylic acid, or (c) a mixture of (a) and (b) in the presence of a fluoroalkanesulfonic acid and a quinquevalent phosphorus halide, such as $PCl_5$. According to column 2, lines 20-21, "Presumably, the reaction proceeds via the in-situ formation of mono- or diacyl halide." (Di)carboxylic acid halide(s) are well known intermediates for the preparation of polyketones (see U.S. Pat. No. 4,398,020).

British Pat. No. 2,099,006 discloses a process for the preparation in trifluoromethanesulfonic acid of poly(ether-ketones) from monocarboxylic acid chlorides (such as 4-phenoxybenzoyl chloride) in which $P_2O_5$ and water may, if desired, be added to the polymerization reactor in order to produce phosphoric acid (to act as a solvent) (see lines 27-41 on page 1 and lines 1-8 and 17-20 on page 2). In this case, however, only the acid chlorides, which are appreciably more reactive than the carboxylic acids, are disclosed. The use of monocarboxylic or dicarboxylic acids is not disclosed.

DISCLOSURE OF THE INVENTION

In the process of the invention, polyketones are prepared by reacting in the presence of a perfluoroalkylsulfonic acid(s) and an oxide of phosphorus the reactants selected from (a) at least one aliphatic, aromatic, or cycloaliphatic dicarboxylic acid and at least one aromatic compound as defined herein, (b) at least one self-polymerizable aromatic monocarboxylic acid, or (c) a mixture of (a) and (b).

The polymerization occurs as HOH is formed by the elimination of an OH group from a carboxylic acid and an H from hydrogen attached to an aromatic ring, the polymer chain becoming linked together between a carbonyl group and an aromatic ring.

Illustrative polyketones produced by the process according to this invention include the following:

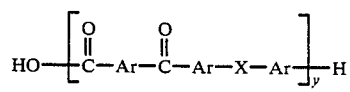

I.

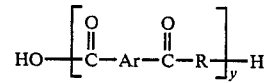

II.

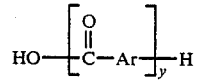

III.

wherein Ar, X, and R are as defined below and y is an integer resulting in a molecular weight sufficient to give an I.V. (inherent viscosity) of at least about 0.4.

The aromatic dicarboxylic acids which are useful in the process of the invention may contain 8 to 30 carbon atoms and include all of those disclosed in British Pat. No. 2,116,990 incorporated herein by reference. Additionally, other aromatic dicarboxylic acids which are not disclosed in British Pat. No. 2,116,990 are also useful in the process of the invention. Such dicarboxylic acids include those having the general formula HOOC—Ar—COOH, where —Ar— is phenylene, naphthalene, or biphenylene and —COOH is an aromatically bound carboxyl group separated from the other —COOH group by at least 3 carbon atoms. In the formula, —Ar— may be substituted with alkyl or alkoxy or with Cl or Br atoms, but no substituent is preferred. Examples of dicarboxylic acids which can be used include terephthalic acid, chloroterephthalic acid, 5-methylisophthalic acid, isophthalic acid, 4,4'-oxidibenzoic acid, 3,4'-, 3,3'-, and 4,4'-biphenyldicarboxylic acids, and 1,3-, 1,4-, 1,5-, 1,6-, 1,7-, 2,5-, 2,6-, and 2,7-naphthalenedicarboxylic acids.

The aromatic monocarboxylic acids which are useful in the process of the invention include all of those disclosed in British Pat. No. 2,116,990 plus other carboxylic acids having the general formula H—Ar'—COOH, where —COOH is as earlier defined, —Ar'— is —Ar'′—O—Ar*—, and H— is an aromatically bound hydrogen atom. In the formula, —Ar"— and —Ar*— may be the same or different and include m-phenylene, p-phenylene, 4,4'-biphenylene, and 3,4'-biphenylene. Examples of monocarboxylic acids which may be used include 4-phenoxybenzoic acid, 4-(phenoxy)phenoxybenzoic acid, 3-phenoxybenzoic acid, and 4-biphenylcarboxylic acid.

Aliphatic and cycloaliphatic dicarboxylic acids containing 6 to 20 carbon atoms are also useful in the process of the invention, but aromatic dicarboxylic acids are preferred because more oxidatively and thermally stable polyketones are obtained with the aromatic acids. For aliphatic dicarboxylic acids, the carboxyl groups should be separated from each other by at least 4 carbon atoms. For cycloaliphatic dicarboxylic acids, the carboxyl groups should be attached directly to the cyclic ring and should be separated from each other by at least 3 carbon atoms. These aliphatic and cycloaliphatic dicarboxylic acids include adipic acid, azelaic acid, sebacic acid, 1,3-cyclohexanedicarboxylic acid (cis and trans isomers), and 1,4-cyclohexanedicarboxylic acid (cis and/or trans isomers).

The aromatic compounds (which have been referred to above as being "defined herein") which may be used in the process of the invention may contain 10 to 30 carbon atoms and include all of those disclosed in British Pat. No. 2,116,990 and U.S. Pat. No. 4,611,033, also incorporated herein by reference, plus other compounds having the general formulae H—Ar—X—Ar—H or H—R—H, where Ar and H— are as defined earlier, —R— is the residue of a polynuclear hydrocarbon (after removal of two hydrogen atoms) containing at least 10 carbon atoms, and —X— is a direct bond, —O—, or —S—. Examples of such aromatic compounds include diphenyl ether, diphenyl sulfide, biphenyl, naphthalene, anthracene, and phenanthrene.

The process of the invention may be carried out in a perfluoroalkylsulfonic acid(s) containing from 1-4 carbon atoms. Trifluoromethanesulfonic acid is preferred because of its commercial availability. The perfluoroalkylsulfonic acid is preferably essentially anhydrous, but small amounts of water can be tolerated. It is convenient to adjust the amount of perfluoroalkylsulfonic acid used so that at least one of the functions of the acid is to act as a solvent for the polymerization. A concentration of about 5 mL of perfluoroalkylsulfonic acid per theoretical gram of polyketone is preferred, but lesser or higher amounts may be used as dictated by the solubility of the starting materials and the polyketone being prepared and by the practicality of recovering the expensive perfluoroalkylsulfonic acid for recycle.

The oxides of phosphorus which may be used in the process of the invention include all of those compounds which contain at least one —P—O—P— unit, such as phosphorus oxides and polyphosphoric acid. The phosphorus oxides include phosphorus trioxide and phosphorus pentoxide. Phosphorus pentoxide ($P_2O_5$ or $P_4O_{10}$) is the preferred oxide of phosphorus. Polyphosphoric acid is considered to be a mixture having approximately the following structure

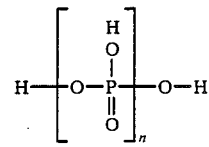

in which "n" is equal to or greater than 2 and a broad range of molecular weights is present. (It should be evident that a phosphorus atom in the above structure may be common to two —P—O—P— units.) Examples of 'polyphosphoric acid' compositions include pyrophosphoric acid (n=2), tripolyphosphoric acid (n=3), tetrapolyphosphoric acid (n=4), etc. Cyclic structures are possible in the polyphosphoric acid structure. The polyphosphoric acid may be prepared from ortho-phosphoric acid and phosphorus pentoxide by well known procedures or it may be obtained commercially.

The amount of oxide(s) of phosphorus should be chosen so that at least about one gram-mole of —P—O—P— unit is present per gram-mole of carboxyl contained in the di- and/or monocarboxylic acid(s) being used in the polymerization. In the preferred case of phosphorus pentoxide, therefore, at least 0.33 gram-mole ($P_2O_5$) per gram-mole of carboxyl is required. (One mole of $P_2O_5$ will react with three moles of water.) It is advantageous to utilize at least about 10% excess of the phosphorus pentoxide to offset contaminant water in the reaction mixture and impurities in the phosphorus pentoxide. Faster rates of polymerization are achieved when more oxide of phosphorus is used, but problems of varying severity with undissolved or poorly dispersed starting materials and/or problems with control of temperature and molecular weight may be encountered, depending on the polyketone composition. An amount of an oxide(s) of phosphorus sufficient to give about 3.5 gram-moles of —P—O—P— unit per gram-mole of carboxyl contained in the di- and/or monocarboxylic acid(s) being utilized in the process is a practical level, but amounts of an oxide(s) of phosphorus sufficient to give 7-8 or more gram-moles of —P—O—P— unit per gram-mole of carboxyl contained in the di- and/or monocarboxylic acid(s) may be used to prepare some polyketone compositions.

If a component having the capability of reacting with water is added to the polymerization in sufficient amount to react with the by-product water from the polymerization plus any contaminant water in the system and/or starting materials, the amount of oxide(s) of phosphorus utilized in the process of the invention may be decreased below one —P—O—P— unit per gram-mole of carboxyl contained in the di- and/or monocarboxylic acid(s). However, in such cases, it may be necessary to carry out the polymerization at an elevated temperature because the rate of polymerization is reduced substantially as the amount of —P—O—P— is reduced. Examples of such components include the anhydrides of perfluoroalkyl- and alkylsulfonic acids. In such polymerization systems, the amount of oxide(s) of phosphorus may be reduced to about at least 0.1 —P—O—P— unit per gram-mole of carboxyl contained in the di- and/or monocarboxylic acids being utilized as monomers. It is preferred, however, that the process of the invention be carried out with at least one —P—O—P— unit per gram-mole of carboxyl without the addition of a component such as a perfluoroalkylsulfonic anhydride.

The reaction may be carried out at 0° to 100° C., but temperatures up to 150° C. may be used with some reactants. The higher polymerization temperatures give faster polymerization rates but increase the probability of undesirable side reactions, such as fluoroalkylsulfonation of aromatic moieties, branching of the polyketone, and/or problems of reactor temperature control because of the exothermicity of the reaction. A temperature of about 10°–40° C. is preferred.

This process preferably is conducted at atmospheric pressure. However, reduced pressures may be used so long as nothing volatilizes from the reaction mixture, and increased pressures up to 3000 psi or more may be used.

The time of the polymerization may vary from a few minutes to several days, depending on the structure of the starting materials, the temperature, the amount of perfluoroalkylsulfonic acid, and the amount of the oxide of phosphorus used. The optimum conditions for the preparation of the polyketones by the process of the invention should be determined experimentally for the desired composition in order to prepare the desired molecular weight. Very high molecular weight polyketones (I.V.'s of up to 2.0 or more) may be prepared by the process of the invention. Preferred I.V.'s for the polyketones prepared by the process of the invention range from about 0.8 to about 1.8. More particularly preferred I.V.'s of the polyketones prepared by the process of the invention range from about 1.0 to about 1.5. Such polymers are useful because of their excellent thermal, oxidative, and hydrolytic stability and their excellent solvent and chemical resistance.

The molecular weight of the polyketones prepared by the process of the invention may be controlled by adding an excess (preferably of the aromatic compound) of one of the starting materials (if a dicarboxylic acid is used) or by the addition of suitable end-capping species, which also may improve the thermal stability of the polyketone product. Benzoic acid or biphenyl may be used for this purpose. Preferably, the end-capping component is one of the aromatic compounds used in the polymerization. In addition to controlling the molecular weight of the polyketone, an excess of the aromatic compound also aids in the control of branching in the polyketone. In a preferred embodiment of the process of the invention, at least 2 mole % excess of an aromatic compound is used to control branching in the polyketone.

The process of the invention may be carried out (1) by adding the perfluoroalkylsulfonic acid to the dicarboxylic acid(s) and aromatic compound(s) defined above and/or the monocarboxylic acid(s) and then adding the oxide(s) of phosphorus, (2) by predissolving or mixing the oxide(s) of phosphorus in the perfluoroalkylsulfonic acid at ambient or somewhat elevated temperature and then adding the dicarboxylic acid(s) and aromatic compound(s) and/or the monocarboxylic acid(s), (3) by first adding the perfluoroalkylsulfonic acid to the polymerization vessel followed by addition of the other polymerization ingredients individually, or (4) by essentially simultaneous addition of all of the starting materials to the polymerization reactor. Also, the reaction, particularly for the preparation of copolyketones, may be carried out in a stepwise manner, such as by reacting the dicarboxylic acid(s) with only a portion of the aromatic compound(s) in a sufficient manner to prepare an oligomer which can be subsequently reacted with the remainder of the aromatic compound(s) to form a high molecular weight polymer. Similarly, the aromatic compound(s) may be reacted with a portion of the dicarboxylic acid(s) followed by further reaction with the remainder of the dicarboxylic acid(s). It may be advantageous to predissolve the di- and/or monodicarboxylic acid(s) and/or the aromatic compound(s) in the perfluoroalkylsulfonic acid and then add the oxide(s) of phosphorus to effect the polymerization. Alternatively, to avoid the formation of 'lumps', it may be advantageous first to add the perfluoroalkylsulfonic acid to the polymerization vessel, begin stirring the reactor contents at a moderate rate, and then add the other polymerization ingredients. For larger batches, the perfluoroalkylsulfonic acid may be placed into the reaction vessel first and then the other materials may be added—the dicarboxylic acid or oxide of phosphorus being added last, in increments if necessary to control the exothermicity of the polymerization. This latter process is generally preferred.

The polyketones prepared by the process of the invention may be isolated by precipitation in aqueous alkali followed by extractions with boiling water or dilute sodium carbonate. The polyketones may be further purified by extractions with suitable solvents or by dissolution in a suitable solvent and reprecipitation in a non-solvent.

By selection of certain starting monomers, the process of the invention may be utilized for the preparation of wholly-aromatic polyketones which exhibit thermotropic liquid crystalline behavior. Such polymers are obtained, for instance, by the reaction of isophthalic acid with biphenyl, the reaction of isophthalic acid with a 70/30 mole ratio of biphenyl/diphenyl ether, and the reaction of 2,6-naphthalenedicarboxylic acid with diphenyl ether. Pressed films of these polymers are opaque, pearlescent, and creasable. It is surprising that these polyketones are liquid crystalline because of the presence of the large number of rigid kinks between the aromatic rings in the polymer chains.

EXAMPLES

The following examples are submitted for a better understanding of the invention. In the examples, the inherent viscosities (I.V.'s) of the polyketones are determined at 25° C. in 98% $H_2SO_4$ at a concentration of 2.5 g/100 mL. The DSC data (endotherm peaks and Tg's) are determined with a Perkin Elmer Differential Scanning Calorimeter, Model DSC-2, at a scan rate of 20° C./min.

EXAMPLE 1

This example illustrates the very rapid rate of polymerization obtained when a dicarboxylic acid and an aromatic compound are polymerized in the presence of a perfluoroalkylsulfonic acid and phosphorus pentoxide. The substantial effect of the $P_2O_5$ can readily be seen by comparison of this example with Example 6 of British Pat. No. 2,166,990 of the prior art. In the British Patent, equimolar amounts of terephthalic acid and p-diphenoxybenzene are reacted in the presence of trifluoromethanesulfonic acid (no $P_2O_5$) for 48 hr at ambient temperature (plus 5 hr at 90° C.) without an observed significant increase in the solution viscosity. In our example, a very high solution viscosity is obtained in only 10 minutes at the same concentration as the British patent example.

A 50-mL, three-necked flask is equipped with a glass stirrer, a nitrogen inlet, and an outlet for the system, and the flask is then flushed well with nitrogen. To the flask are added 1.25 g (0.0075 mole) of terephthalic acid, 1.97 g (0.0075 mole) of p-diphenoxybenzene, 15 mL of trifluoromethanesulfonic acid, and 2.56 g (0.018 mole) (1.20 mole per mole of carboxyl) of phosphorus pentoxide ($P_2O_5$). The flask is stirred as the polymerization proceeds. The polymerization mixture rapidly becomes a dark red-amber color and is sufficiently viscous after 10 min to wind up on the stirrer, even when stirred at a very slow rate. The poly(ether-ketone) is precipitated in 10% aqueous sodium hydroxide in a Waring blender and allowed to stand overnight. The mixture is then filtered, boiled 2X in dilute aqueous $Na_2CO_3$ for 1–2 hr each and filtered, boiled 2X in deionized water for 1–2 hr each and filtered, and vacuum dried overnight at 110° C. The I.V. of the cream-colored polyketone is 1.43.

The following examples illustrate the broad applicability of the process of the invention regarding the preparation of aromatic polyketones. Example 1 is repeated, except the dicarboxylic acids, the aromatic compounds, the amount of $P_2O_5$, and the reaction times are as specified below in Examples 2–11. "NDC" is 2,6-naphthalenedicarboxylic acid, "BPDC" is 4,4'-biphenyldicarboxylic acid, "IPA" is isophthalic acid, "TPA" is terephthalic acid, "DPB" is p-diphenoxybenzene, "DPE" is diphenyl ether, "BP" is biphenyl, "N" is naphthalene, and "DPBP" is 4,4'-diphenoxybiphenyl. The column heading "Acid" is more fully described as "Dicarboxylic Acid" and the column heading "H—R—H" is more fully described as "Aromatic Compound".

acid and 1.28 g (0.0075 mole) of distilled diphenyl ether. A dark, red-brown color forms in the polymerization mixture fairly rapidly and a high viscosity solution is obtained after 30 hr. The cream-colored polyketone is isolated as described in Example 1 to give an I.V. of 0.92, a Tg of 209° C., and a Tm at 436° C.

The preceding example is repeated using equimolar quantities of 4,4'-oxydibenzoic acid and p-diphenoxybenzene (0.015 mole) as monomers, 8.6 g (0.06 mole) of phosphorus pentoxide, and 51 ml of trifluoromethanesulfonic acid. The very high viscosity solution is precipitated and purified as described in Example 1. The cream-colored polyketone has an I.V. of 1.24.

EXAMPLE 13

This example illustrates the utility of the process of the invention for the preparation of polyketones from an aliphatic dicarboxylic acid and an aromatic compound.

A 50-mL, three-necked flask is equipped as described in Example 1 and 1.10 g (0.0075 mole) of adipic acid, 1.97 g (0.0075 mole) of p-diphenoxybenzene, 2.56 g (0.018 mole) of phosphorus pentoxide, and 15 mL of trifluoromethanesulfonic acid are added. The contents of the flask are stirred at 23° C. for 7 hours to obtain a high viscosity, very dark amber solution which is precipitated and dried as described in Example 1. The cream-colored polyketone has an I.V. of 1.64, a Tg of 92° C., and a Tm of 279° C. (Note: This result is in contrast to that disclosed in the prior art for the preparation of polyketones from adipic acid and an aromatic compound in a mixture of methanesulfonic acid and phosphorus pentoxide. The prior art gave only "black" polymers; see Makromol. Chem., Rapid Communica-

| Ex. | Acid | H—R—H | $P_2O_5$/—COOH, Moles/Mole | DSC, °C. Tg/Tm | Reaction Time, Hr | I.V. |
|---|---|---|---|---|---|---|
| 2 | IPA | DPB | 0.00 | — | 1150 | 0.29 |
| 3 | IPA | DPB | 1.22 | 156/224 | 0.3 | 1.99 |
| 4 | NDC | DPB | 1.36 | 184/361 | 7 | 1.00 |
| 5 | BPDC | DPE | 1.17 | — | 268 | 0.44* |
| 6 | NDC | DPE | 1.20 | 210/395 | 24 | 1.12 |
| 7 | TPA | BP | 1.20 | None/>450 | 70 | 2.14 |
| 8 | BPDC | DPB | 1.20 | 180/411** | 1.2 | 1.57 |
| 9 | IPA | DPBP | 1.20 | — | 1.2 | 0.83 |
| 10 | IPA | BP | 1.20 | 201/332 | 22 | 1.53 |
| 11 | NDC | N | 1.20 | — | 166 | 1.02 |

*This relatively low I.V. may be due to the formation of a large 'lump' initially. (See Example 12, 0.92 I.V. obtained.)
**This value obtained on same composition.

EXAMPLE 12

This example illustrates the utility of the process of the invention when the phosphorus pentoxide is 'predissolved' at a somewhat elevated temperature in the perfluoroalkylsulfonic acid before the dicarboxylic acid and aromatic compound are added. (By this procedure, apparently some anhydride of the perfluoroalkylsulfonic acid is initially formed.)

A 50-mL, three-necked flask is equipped as described in Example 1 and 2.6 g (0.018 mole) of phosphorus pentoxide and 15 mL of trifluoromethanesulfonic acid are added. The flask is then stirred and heated to 50° C. under a nitrogen atmosphere for 6 hours and cooled to room temperature. After being allowed to stand overnight at 23° C., a very slight haze is apparent in a liquid phase with a very small amount of solid present on the bottom of the flask. To the flask with stirring are then added 1.82 g (0.0075 mole) 4,4'-biphenyldicarboxylic tion No. 5, page 835, 1985.) This reference also points out on this page that only "a low molecular weight polymer is produced from isophthalic acid."

EXAMPLE 14

This example illustrates the utility of the process of the invention for the preparation of a polyketone from a cycloaliphatic dicarboxylic acid and an aromatic compound.

A 50-mL, three-necked flask is equipped as described in Example 1 and 16 mL of trifluoromethanesulfonic acid and 2.7 g (0.019 mole) of phosphorus pentoxide are added. The contents of the flask are heated with stirring to 50° C., held for 6 hours, cooled to 23° C., and allowed to stand for about 18 hours. To the flask are than added 1.72 g (0.01 mole) trans-1,4-cyclohexanedicarboxylic acid and 1.70 g (0.01 mole) of diphenyl ether. The contents of the flask are stirred at 23° C. for about 8 hours and then allowed to stand for an additional 24 hours. At this time, the solution viscosity has become very high and the color is very dark red-amber. The cream-colored polyketone is isolated as described in Example 1. It has an I.V. of 1.84. A DSC curve indicates a Tg at 170° C. and a Tm at 332° C.

Examples 15–17 illustrate the utility of the process of the invention for the preparation of polyketones and copolyketones from an aromatic monocarboxylic acid.

EXAMPLE 15

A 50-mL, three-necked flask is equipped as described in Example 1 and 3.21 g (0.015 mole) of 4-phenoxybenzoic acid, 2.46 g (0.018 mole) of phosphorus pentoxide, and 15 mL of trifluoromethanesulfonic acid are added. The polymerization is stirred under nitrogen for 30 hr to obtain a moderately high solution viscosity. The polyketone is isolated as described in Example 1. The ivory-colored, fibrous product has an I.V. of 1.25 and has a Tg at 162° C. and a Tm at 363° C.

EXAMPLE 16

A 50-mL, three-necked flask is equipped as described in Example 1, and 14 mL of trifluoromethanesulfonic acid, 2.97 g (0.015 mole) of 4-biphenylcarboxylic acid, and 2.56 g (0.018 mole) of phosphorus pentoxide are added. The contents of the flask is stirred for several hours and then allowed to stand at 23° C. for a total of 312 hours. The polymerization mixture is very dark red-amber and winds up on the stirrer rotating at a very slow rate. The cream-colored, fibrous polyketone is isolated and dried as described in Example 1 to give an I.V. of 1.41.

EXAMPLE 17

A 50-mL, three-necked flask is equipped as described in Example 1, and 1.08 g (0.005 mole) of 2,6-naphthalenedicarboxylic acid, 1.07 g (0.005 mole) of 4-phenoxybenzoic acid, 14 mL of trifluoromethanesulfonic acid, 2.56 g (0.018 mole) of phosphorus pentoxide, and 0.85 g (0.005 mole) of diphenyl ether are added as the contents of the flask are stirred at a moderate rate. The mixture is stirred for several hours and then is allowed to stand for a total of 168 hours at 23° C. The dark red-amber, moderately viscous solution is then precipitated and dried as described in Example 1 to obtain a cream-colored polymer which has an I.V. of 0.75. An tough, opaque film of the copolyketone is pressed in a Hannafin press at 325° C. A DSC curve indicates a Tg at 181° C. and a Tm at 314° C.

The following examples illustrate the effect of the amount of perfluoroalkylsulfonic acid on the preparation of polyketones by the process of the invention. Example 3 is repeated except for the amount of trifluoromethanesulfonic acid (TFSA) used, and Example 3 is included for comparison.

| Ex. | TFSA Used, Ml/G.* | Polymerization Time, Min | I.V. | Comments** |
|---|---|---|---|---|
| 18 | 2.6 | 255 | 1.25 | Very high visc; lumps |
| 3 | 5.2 | 20 | 1.99 | No visible lumps |
| 19 | 10.4 | 360 | 1.49 | Low visc; no lumps |

*Ml TFSA per calculated gram of polyketone.
**The observed lumps in the reaction mixture are presumed to be starting materials or some complex formed therefrom.

EXAMPLE 20

The following example illustrates the utility of the process of the invention when the dicarboxylic acid and aromatic compound are 'predissolved' in the perfluoroalkylsulfonic acid before the phosphorus pentoxide is added and, also, the effect of amount of phosphorus pentoxide on the polymerization rate.

A 50-mL, three-necked flask is equipped as described in Example 1. To the flask are added 1.25 g (0.0075 mole) of isophthalic acid, 1.97 g (0.0075 mole) of p-diphenoxybenzene, and 15 mL of trifluoromethanesulfonic acid. After being stirred under nitrogen for 1 hr, a uniform solution is obtained. To the flask are then added 2.6 g (0.018 mole, 1.2 moles/mole of —COOH) of phosphorus pentoxide while stirring is continued. After being stirred for an additional 67 min, the polymerization mixture is very high viscosity and is winding up on the stirrer rotating at a slow speed. The poly(etherketone) is isolated and dried as described in Example 1. The I.V. of the polymer is 2.71.

The preceding example is repeated except only 1.42 g (0.01 mole, 0.67 mole/mole of —COOH) of phosphorus pentoxide is used, and the reaction time is 22 hours. The I.V. of the cream-colored polyketone is 1.06.

The following examples illustrate the effect of the amount of oxide of phosphorus utilized in the process of the invention (see also Example 20). Example 6 is repeated except for the amount of phosphorus pentoxide used per mole of carboxyl, and Example 6 is included for comparison.

| Ex. | P$_2$O$_5$/—COOH, Moles/Mole | Polymerization Time, Hr. | I.V. | Comments |
|---|---|---|---|---|
| 21 | 0.83 | 315 | 1.07 | Uniform solution |
| 6 | 1.20 | 24 | 1.12 | " |
| 22 | 1.67 | 7 | 1.32 | Lumps evident in soln. |
| 23 | 2.50 | 5.3 | 0.77 | Large lump in 5 min. |

Example 24 illustrates the utility of the process of the invention at elevated temperature and relatively low levels of phosphorus pentoxide.

EXAMPLE 24

A 50-mL, three-necked flask is equipped as described in Example 1. The entire flask assembly plus all other glassware (such as syringes used for transferring the trifluoromethanesulfonic acid) are then placed in a forced-air oven at 130° C. for 45 min to remove adsorbed water. The flask assembly is then removed from the oven and filled with dry nitrogen immediately. To the moderately stirred contents of the flask are then added 15 mL of dry trifluoromethanesulfonic acid (with dry syringe), 1.54 g (0.01 mole) of biphenyl, and 1.66 g (0.01 mole) of isophthalic acid. At this time, 0.99 g (0.0070 mole, 0.35 mole/mole of —COOH) of phosphorus pentoxide (99.998%) is weighed out in a dry box and then added to the stirred contents of the polymerization flask. The flask is then heated with stirring to 100° C. during 15 minutes and held for 6.9 hours, cooled to 23° C. for the weekend, reheated with stirring to 100° C. for 7.5 hours, and recooled to 23° C. overnight. At this time, the polymerization mixture is moderately viscous. The polymer is precipitated, washed, and dried as described in Example 1 to obtain a cream-colored polyketone which has an I.V. of 1.06. Examples 25–28 illustrate the utility of polyphosphoric acid as the oxide of phosphorus in the process of the invention. (The polyphosphoric acid utilized is commercial grade which by phosphorus analysis contains an average of 4 P atoms/mole).

EXAMPLE 25

A 50-mL, three-necked flask is equipped and dried as described in Example 24. To the dry flask are then added 2.25 g (0.0067 mole; 0.33 mole/mole of —COOH or 1.0 —P—O—P— unit/mole of carboxyl) of polyphosphoric acid and 15 mL of trifluoromethanesulfonic acid (with dry syringe). The mixture is then stirred at 23° C. until a uniform solution is obtained (about 15 minutes). At this time, 1.54 g (0.01 mole) of biphenyl and 1.66 g (0.01 mole) of isophthalic acid are added to the stirred mixture, and the flask is heated to 120° C. during 20 minutes. The flask is stirred at 120° C. for 6 hours, cooled to 23° C. overnight, and reheated with stirring to 120° C. for 5.7 hours. At this time, the viscosity of the polymerization mixture is sufficient to wind up on the stirrer rotating a a slow speed. The polyketone is isolated and dried as described in Example 1 to obtain a cream-colored product which has an I.V. of 0.86.

EXAMPLE 26

A 50-mL, three-necked flask is equipped as described in Example 1, and 15 mL of trifluoromethanesulfonic acid and 12.90 g (0.038 mole) of polyphosphoric acid are added. After being stirred at 23° C. for about an hour, the reaction mixture is clear and uniform. To this solution are added 1.54 g (0.01 mole) of biphenyl and 1.66 g (0.01 mole) isophthalic acid, and the flask contents are stirred with heating to 100° C. for 6 hours. At this time, the viscosity of the polymerization mixture has increased sufficiently to wind up on the stirrer rotating at a slow speed. The polyketone is isolated and dried as described in Example 1 to obtain a cream-colored product having an I.V. of 1.61.

When this example is repeated using no oxide of phosphorus in the polymerization, a very low solution viscosity is apparent even after 7 hours at 100° C. plus 16 hours at 23° C.

EXAMPLE 27

A 50-mL, three-necked flask is equipped as described in Example 1. To the flask are then added 1.62 g (0.0075 mole) of 2,6-naphthalenedicarboxylic acid, 1.28 g (0.0075 mole) of distilled diphenyl ether, 14 mL of trifluoromethanesulfonic acid, and 6.97 g of polyphosphoric acid, and stirring of the contents of the flask is initiated immediately. The polymerization is allowed to continue for a total of 78 hours. The solution viscosity at this time is moderately high. The polyketone is isolated and dried as described in Example 1. The I.V. of the light yellow polyketone is 0.85. A film pressed at 400° C. in a Hannafin press is tough and opalescent.

EXAMPLE 28

A 50-mL, three-necked flask is equipped as described in Example 1, and 15 mL of trifluoromethanesulfonic acid and 9.68 g of polyphosphoric acid are added. After being stirred at 23° C. for one hour, the reaction mixture is clear and uniform. To this solution is added 1.97 g (0.0075 mole) of p-diphenoxybenzene, and the flask contents is stirred and heated to 60° C. for about 60 minutes. After being cooled to 23° C., a substantially hazy mixture is obtained. To this mixture is then added 1.25 g (0.0075 mole) of terephthalic acid, and the polymerization mixture is stirred at 23° C. for 6 hours to obtain a moderately viscous solution which is isolated and dried as described in Example 1. The I.V. of the polyketone is 0.77. A film pressed at 400° C. is tough and essentially transparent.

Examples 29–31 illustrate the utility of the process of the invention at a higher than ambient polymerization temperature (See Examples 24–26).

EXAMPLE 29

Example 6 is repeated, except the reaction is carried out at 50° C. for 6.5 hr instead of at 23° C. for 24 hr. The poly(ether-ketone) has an I.V. of 1.23.

EXAMPLE 30

A 50-mL, three-necked flask is equipped as described in Example 1, and 14 mL of trifluoromethanesulfonic acid and 1.62 g (0.0075 mole) of 2,6-naphthalenedicarboxylic acid are added. The flask contents are then stirred for 30 min to obtain a uniform, clear solution. At this time, 1.28 g (0.0075 mole) of diphenyl ether and 2.56 g (0.018 mole) of phosphorus pentoxide are added to the well stirred contents of the flask, and the flask is heated to 100° C. After being stirred at 100° C. for 2 hours and 10 min, the dark-red polymerization mixture contains some small lumps and is winding up on the stirrer rotating at a slow speed. The polyketone is isolated and vacuum dried as described in Example 1 to obtain a cream-colored polymer having an I.V. of 2.03.

EXAMPLE 31

Example 29 is repeated except the polymerization mixture, after addition of the last two ingredients, is heated toward 145° C. instead of only to 100° C. After being stirred and heated for 40 min, the reaction temperature has reached only 135° C. and the polymerization mixture is winding up on the stirrer rotating at a slow speed. The polyketone is isolated and dried as described in Example 1 to obtain a cream-colored polymer having an I.V. of 2.28.

EXAMPLE 32

This example illustrates the utility of the process of the invention for the preparation of a copolyketone by a two-step method (see also Example 17 for another copolyketone preparation).

To a 50-mL, three-necked flask equipped as described in Example 1 are added 0.25 g (0.0015 mole) of isophthalic acid and 13.5 mL of trifluoromethanesulfonic acid. The mixture is stirred for 3 minutes to obtain a clear solution, and 1.28 g (0.0075 mole) of diphenyl ether and 2.56 g (0.018 mole) of $P_2O_5$ are added. After the mixture is stirred at ambient temperature for about 4.5 hr, a red-amber, low-viscosity solution is obtained. To this is added 1.30 g (0.0060 mole) of 2,6-naphthalenedicarboxylic acid. The mixture is stirred for an additional 2.8 hr followed by standing overnight and additional stirring at ambient temperature for a total reaction time of 30 hr. The moderately viscous, red-amber polymerization mixture is then isolated as described in Example 1 and vacuum dried. The cream-colored copoly(ether-ketone) has an I.V. of 0.81, a Tg of 193° C., and a Tm of 351° C.

EXAMPLE 33

This example illustrates the utility of the new process of the invention for the preparation of poly(sulfide-ketones), which are polyketones containing sulfur atoms instead of ether oxygen atoms.

A 50-mL, three-necked flask is equipped as described in Example 1, and 1.62 g (0.0075 mole) of 2,6-naphthalenedicarboxylic acid and 14.5 mL of trifluoromethanesulfonic acid are added. After being stirred for 20 minutes at ambient temperature, the reaction mixture is clear and light yellow. At this time, 2.56 g (0.018 mole, 1.2 mole/mole of —COOH) of $P_2O_5$ and 1.40 g (0.0075 mole) of diphenyl sulfide are added to the well stirred polymerization mixture. After a total of 30 hr, the solution viscosity has increased to a moderate level. The poly(sulfide-ketone) is isolated and dried as described in Example 1 and has an I.V. of 0.75. A DSC curve indicates a Tg at 215° C. and a Tm at 413° C.

EXAMPLE 34

This example illustrates the utility of the process of the invention for the preparation of a polyketone of a polynuclear hydrocarbon.

A 50-mL, three-necked flask is equipped as described in Example 1, and 1.62 g (0.0075 mole) of 2,6-naphthalenedicarboxylic acid, 1.34 g (0.0075 mole) of phenanthrene, 14 mL of trifluoromethanesulfonic acid, and 2.56 g (0.018 mole) of phosphorus pentoxide are added. After being stirred at 23° C. for about 7 hours, the flask is allowed to stand overnight (16 hr). At this time, the polymerization mixture is very viscous and winds up on the stirrer shaft when slow stirring is attempted. The polyketone is isolated and vacuum dried as described in Example 1 to obtain a cream-colored polymer having an I.V. of 1.71 and a weak DSC endotherm at 296° C.

EXAMPLE 35

This example illustrates the utility of the process of the invention for the preparation (in which the phosphorus pentoxide is 'predissolved' in the trifluoromethanesulfonic acid before the other polymerization ingredients are added) and purification of a liquid crystalline polyketone.

A 50-mL, three-necked flask is equipped as described in Example 1, and 15 mL of trifluoromethanesulfonic acid and 2.5 g (0.018 mole) of phosphorus pentoxide are added. After being stirred at 50° C. for 7 hours, the mixture is allowed to stand overnight (16 hours). To the stirred, slightly hazy reaction mixture is then added 1.66 g (0.01 mole) of isophthalic acid and 1.54 g (0.01 mole) of biphenyl. After being stirred at 23° C. for 8.4 hours, the polymerization mixture is allowed to stand at 23° C. for 71 hours to obtain a very high viscosity solution which winds up on the stirrer at a slow speed. The polyketone is isolated and vacuum dried as described in Example 1. To purify the polyketone, 1.3 g are dissolved in 30 mL of m-cresol at 195° C. and cooled to room temperature with no sign of gelling or precipitation. The polyketone is reprecipitated by slow addition of the m-cresol solution to acetone in a Waring blender. After being washed twice with acetone and leached twice with boiling acetone, the polyketone is vacuum dried at 150° C./7 torr/overnight plus 190° C./4 hr/0.1 torr to give an off-white product which has an I.V. of 2.20 and endotherms (by DSC) at 330° C. and 453° C. A film pressed at 375° C. in a Hannafin press is opaque-pearlescent and is very tough.

EXAMPLE 36

This example illustrates the utility of the process of the invention for the preparation of a larger batch of polyketone in which an excess of aromatic compound is used to limit the I.V. of the polyketone.

A 300-mL, three-necked flask is equipped with a glass stirrer with Teflon blade, a nitrogen inlet, an outlet for the system, and a 10° C. chilled-water bath for cooling. All of the glassware is then placed in a forced-air oven at 130° C. for 30 minutes to remove the adsorbed water. The flask assembly is filled with nitrogen while still hot, and cooled to room temperature. To the flask is then added 111 mL of trifluoromethanesulfonic acid, and the flask and its contents are cooled to 15° C. with stirring. To the cold, stirred acid are then added in order 12.01 g (0.078 mole) (4 mole % excess) of biphenyl and 21.3 g (0.075 mole) of phosphorus pentoxide (weighed out in a dry box into a dried glass vial and transported to the polymerization flask). To the well-stirred and cooled polymerization mixture is then added 12.45 g (0.075 mole) of isophthalic acid in four portions over a period of 15 minutes. The temperature of the polymerization mixture does not increase to more than 25° C. during the addition. After being stirred for about 30 minutes at 15 degrees Centigrade, the chilled water cooling bath is removed from the flask and the temperature is allowed to rise to room temperature. The polymerization is continually stirred under a nitrogen atmosphere for an additional 20 hours to obtain a dark red amber, high-viscosity solution which winds up on the stirrer rotating at a moderate rate. The polyketone is precipitated by pouring a small stream into water in a Waring blender. The cream-colored particulate polyketone is filtered out, placed in a beaker with 1000 mL of water on a hot plate, boiled 2X for about 1 hour, filtered, rinsed with more water, and vacuum-dried overnight at 20 inches of Hg and 95° C. The polyketone has an I.V. of 1.42 and gives a tough opaque/opalescent pressed film.

The above experiment is repeated except 5 mole % excess of biphenyl is used instead of 4 mole % excess. The polymerization mixture after 22 hours stirred at 23° C. has a moderate solution viscosity, and, when isolated and dried as described above, has an I.V. of 0.82.

EXAMPLE 37

This example illustrates the utility of a preferred process of the invention for the preparation of a larger batch of polyketone in which an excess of the aromatic compound is used to limit the I.V. of the polyketone and the polymerization is carried out at a relatively low temperature to obtain a polyketone containing a very low level of color.

A 500-mL., three-necked flask is equipped and pretreated as described in Example 36. To the flask is then added 222 mL of trifluoromethanesulfonic acid, and the flask and its contents are cooled by means of the chilled water cooling bath of 12° C. with stirring. To the cold, stirred acid is then added 24.90 g (0.15 mole) of isophthalic acid, and the temperature increases to 22° C. during about 3 minutes even though the chilled water bath is in place. After an additional 5 minutes of stirring and cooling, the temperature of the polymerization mixture has decreased to 13° C., and 23.56 g (0.153 mole, 2 mole % excess) of biphenyl is added with no exotherm noted during 4 minutes of additional stirring and cooling. At this time, 42.60 g (0.30 mole) of phosphorus pentoxide (weighed out in a dry box into a dried glass container and transported to the polymerization flask) is added. The temperature of the polymerization mixture increases to 22° C. during 2 minutes and decreases again to 14° C. during an additional 18 minutes of stirring and cooling. The polymerization mixture at this time is a dark amber color. The solution viscosity of the polyketone increases steadily during 41 hours of additional stirring and cooling at 14°-20° C. (15°-16° C. during the majority of this period) to give a dark-amber, very high viscosity mixture which winds up on the stirrer shaft rotating at a slow rate. The polyketone product is precipitated as described in Example 36, boiled 2X in deionized water for about an hour, stirred for about 15 minutes with acetone in a Waring blender to remove the majority of the water, filtered, and vacuum dried for three days at 20 inches of Hg at 25° C. The off-white polyketone has an I.V. of 2.68, is completely soluble after being dissolved at 175° C. in m-cresol and then cooled to room temperature, and gives a tough opaque/opalescent pressed film when pressed at 375° C.

Example 37 is repeated except 4 mole % excess of biphenyl is used, the polymerization temperature (after being initially cooled) is 25°-30° and the polymerization time is 114 hours. The polyketone has an I.V. of 1.33 and is completely soluble when dissolved at room temperature in m-cresol.

The invention has been described in detail with particular reference to preferred embodiments thereof, but it will be understood that variations and modifications will be effected within the spirit and scope of the invention.

We claim:

1. Process for preparing polyketones comprising reacting
    I. (A) a dicarboxylic acid selected from
        (a) aromatic dicarboxylic acids having 8-30 carbon atoms wherein the carboxyl groups are attached directly to the aromatic ring and are separated from each other by at least 3 carbon atoms,
        (b) cycloaliphatic dicarboxylic acids having 6 to 20 carbon atoms wherein the carboxyl groups are attached directly to the cyclic ring and are separated from each other by at least 3 carbon atoms, or
        (c) aliphatic carboxylic acids having 6 to 20 carbon atoms wherein the carboxyl groups are separated from each other by at least 4 carbon atoms, and
    (B) at least one aromatic compound having at least 10 carbon atoms and at least 2 hydrogen atoms bound to an aromatic ring, or
    II. a self-polymerizable aromatic monocarboxylic acid having at least 13 carbon atoms wherein reacting hydrogen atom and the carboxyl group are on different aromatic rings, or
    III. mixture of I and II as defined above in the presence of a perfluoroalkylsulfonic acid containing 1 to 4 carbon atoms and an oxide of phosphorus having at least one —P—O—P— unit in an amount of at least one gram-mole of —P—O—P— unit is present per gram-mole of carboxyl contained in the dicarboxylic acid, monocarboxylic acid, or mixture thereof, at a temperature of about 0°-150° C. until the desired degree of polymerization is achieved.

2. Process for preparing polyketones comprising reacting
    (A) A dicarboxylic acid selected from
        (a) aromatic dicarboxylic acids having 8-30 carbon atoms wherein the carboxyl groups are attached directly to the aromatic ring and are separated from each other by at least 3 carbon atoms,
        (b) cycloaliphatic dicarboxylic acids having 6 to 20 carbon atoms wherein the carboxyl groups are attached directly to the cyclic ring and are separated from each other by at least 3 carbon atoms, or
        (c) aliphatic carboxylic acids having 6 to 20 carbon atoms wherein the carboxyl groups are separated from each other by at least 4 carbon atoms, and
    (B) at least one aromatic compound having at least 10 carbon atoms and at least 2 hydrogen atoms bound to an aromatic ring, in the presence of a perfluoroalkylsulfonic acid containing 1 to 4 carbon atoms and an oxide of phosphorus having at least one —P—O—P— unit in an amount of at least one gram-mole of —P—O—P— unit is present per gram-mole of carboxyl contained in the dicarboxylic acid, at a temperature of about 0°-150° C. until the desired degree of polymerization is achieved.

3. Process for preparing polyketones comprising reacting a self-polymerizable aromatic monocarboxylic acid having at least 13 carbon atoms wherein reacting hydrogen atom and the carboxyl group are on different aromatic rings, in the presence of a perfluoroalkylsulfonic acid containing 1 to 4 carbon atoms and an oxide of phosphorus having at least one —P—O—P— unit in an amount of at least one gram-mole of —P—O—P— unit is present per gram-mole of carboxyl contained in the monocarboxylic acid, at a temperature of about 0°-150° C. until the desired degree of polymerization is achieved.

4. Process for preparing polyketones comprising reacting
    I. (A) a dicarboxylic acid selected from
        (a) aromatic dicarboxylic acids having 8-30 carbon atoms wherein the carboxyl groups are attached directly to the aromatic ring and are separated from each other by at least 3 carbon atoms,
        (b) cycloaliphatic dicarboxylic acids having 6 to 20 carbon atoms wherein the carboxyl groups are attached directly to the cyclic ring and are separated from each other by at least 3 carbon atoms, or
        (c) aliphatic carboxylic acids having 6 to 20 carbon atoms wherein the carboxyl groups are separated from each other by at least 4 carbon atoms, and
    (B) at least one aromatic compound having at least 10 carbon atoms and at least 2 hydrogen atoms bound to an aromatic ring, or
    II. a self-polymerizable aromatic monocarboxylic acid having at least 13 carbon atoms wherein reacting hydrogen atom and the carboxyl group are on different aromatic rings in the presence of a perfluoroalkylsulfonic acid containing 1 to 4 carbon atoms and an oxide of phosphorus having at least one —P—O—P— unit in an amount of at least one gram-mole of —P—O—P— unit is present per gram-mole of carboxyl contained in the di- or monocarboxylic acid, at a temperature of about 0°-150° C. until the desired degree of polymerization is achieved.

5. Process according to claim 1 wherein said dicarboxylic acid is selected from terephthalic acid, chloroterephthalic acid, 5-methyl-isophthalic acid, isophthalic acid, 4,4'-oxydibenzoic acid, 3,4'-, 3,3'-, and 4,4'- diphenyldicarboxylic acids and 1,3-, 1,4-, 1,5-, 1,6-, 1,7-, 2,5-, 2,6-, 2,7-naphthalenedicarboxylic acids, adipic acid, azelaic acid, sebacic acid, 1,3-cyclohexanedicarboxylic acid or 1,4-cyclohexanedicarboxylic acid.

6. Process according to claim 2 wherein said dicarboxylic acid is selected from terephthalic acid, chloroterephthalic acid, 5-methyl-isophthalic acid, isophthalic acid, 4,4'-oxydibenzoic acid, 3,4'-, 3,3'-, and 4,4'-diphenyldicarboxylic acids and 1,3-, 1,4-, 1,5-, 1,6-, 1,7-, 2,5-, 2,6-, 2,7-naphthalenedicarboxylic acids, adipic acid, azelaic acid, sebacic acid, 1,3-cyclohexanedicarboxylic acid or 1,4-cyclohexanedicarboxylic acid.

7. Process according to claim 1 wherein said monocarboxylic acid is selected from 4-phenoxybenzoic acid, 4-(phenoxy)phenoxybenzoic acid, 3-phenoxybenzoic acid or 4-biphenylcarboxylic acid.

8. Process according to claim 2 wherein said monocarboxylic acid is selected from 4-phenoxybenzoic acid, 4-(phenoxy)phenoxybenzoic acid, 3-phenoxybenzoic acid or 4-biphenylcarboxylic acid.

9. Process according to claim 1 wherein said aromatic compounds are selected from diphenyl ether, diphenyl sulfide, biphenyl, naphthalene, anthracene or phenanthrene.

10. Process according to claim 2 wherein said aromatic compounds are selected from diphenyl ether, diphenyl sulfide, biphenyl, naphthalene, anthracene or phenanthrene.

11. Process according to claim 1 wherein said perfluoroalkylsulfonic acid is essentially anhydrous.

12. Process according to claim 1 wherein said perfluoroalkylsulfonic acid is trifluoromethanesulfonic acid.

13. Process according to claim 1 wherein said perfluoroalkylsulfonic acid is present in an amount of about 5 mL per gram of polyketone.

14. Process according to claim 1 wherein said phosphorus oxide is phosphorus trioxide or phosphorus pentoxide.

15. Process according to claim 1 wherein said phosphorus oxide is a polyphosphoric acid.

16. Process according to claim 1 wherein the reaction is carried out at a temperature of about 10°–40° C.

* * * * *

UNITED STATES PATENT AND TRADEMARK OFFICE
CERTIFICATE OF CORRECTION

PATENT NO. : 4,820,794
DATED : April 11, 1989
INVENTOR(S) : William R. Darnell and Winston J. Jackson, Jr.

It is certified that error appears in the above-identified patent and that said Letters Patent is hereby corrected as shown below:

In Column 17, line 17, Claim 8, "claim 2" should read ---claim 3---.

Signed and Sealed this

Twenty-eighth Day of November 1989

Attest:

JEFFREY M. SAMUELS

*Attesting Officer*       *Acting Commissioner of Patents and Trademarks*